(12) United States Patent
Takahashi

(10) Patent No.: US 12,051,580 B2
(45) Date of Patent: Jul. 30, 2024

(54) MASS SPECTROMETRY METHOD AND MASS SPECTROMETER

(71) Applicant: SHIMADZU CORPORATION, Kyoto (JP)

(72) Inventor: Hidenori Takahashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 467 days.

(21) Appl. No.: 17/607,098

(22) PCT Filed: Jan. 14, 2020

(86) PCT No.: PCT/JP2020/000926
§ 371 (c)(1),
(2) Date: Oct. 28, 2021

(87) PCT Pub. No.: WO2020/240908
PCT Pub. Date: Dec. 3, 2020

(65) Prior Publication Data
US 2022/0230861 A1    Jul. 21, 2022

(30) Foreign Application Priority Data

May 31, 2019    (JP) .................................. 2019-102066

(51) Int. Cl.
*H01J 49/36*    (2006.01)
*H01J 49/00*    (2006.01)
(Continued)

(52) U.S. Cl.
CPC ...... *H01J 49/0036* (2013.01); *H01J 49/0031* (2013.01); *H01J 49/0077* (2013.01); *H01J 49/0495* (2013.01); *H01J 49/4215* (2013.01)

(58) Field of Classification Search
CPC .............. H01J 49/0036; H01J 49/0031; H01J 49/0077; H01J 49/0495; H01J 49/4215; H01J 49/0045; G01N 27/62
(Continued)

(56) References Cited

U.S. PATENT DOCUMENTS

2008/0296486 A1    12/2008 Blanksby et al.
2009/0152458 A1    6/2009 Vilkov et al.
(Continued)

FOREIGN PATENT DOCUMENTS

AU    2007211893 A1    12/2008
CA    2 951 762 A1    12/2015
(Continued)

OTHER PUBLICATIONS

Office Action issued Feb. 18, 2024 in Chinese Application No. 202080034674.7.
(Continued)

*Primary Examiner* — Michael Maskell
(74) *Attorney, Agent, or Firm* — Sughrue Mion, PLLC

(57) ABSTRACT

In a mass spectrometry method for generating product ions from a precursor ion derived from a sample component having a hydrocarbon chain and mass-analyzing the product ion, the precursor ion is irradiated with an oxygen radical or a hydroxy radical and a nitrogen oxide radical to generate product ions, the product ions are separated according to mass-to-charge ratio and the product ions are detected, and a structure of the hydrocarbon chain is inferred based on mass-to-charge ratio of the detected product ions.

11 Claims, 8 Drawing Sheets

(51) Int. Cl.
*H01J 49/04* (2006.01)
*H01J 49/42* (2006.01)

(58) Field of Classification Search
USPC .................................................. 250/281, 282
See application file for complete search history.

(56) References Cited

U.S. PATENT DOCUMENTS

2019/0004071 A1* 1/2019 Takahashi ........... H01J 49/0036
2021/0050198 A1 2/2021 Takahashi

FOREIGN PATENT DOCUMENTS

CN 109148257 A 1/2019
WO 2019/155725 A1 8/2019

OTHER PUBLICATIONS

Scott A. McLuckey, "Principles of collisional activation in analytical mass spectrometry", Journal of the American Society for Mass Spectrometry, 1992, pp. 599-614, vol. 3.
Shuichi Shimma et al., "Detailed structural analysis of lipids directly on tissue specimens using a MALDI-SpiralTOF-Reflectron TOF mass spectrometer", PloS one, May 2012, pp. 1-8, vol. 7, Issue 5, e37107.
Robert E. Deimler et al., "Radical-induced fragmentation of phospholipid cations using metastable atom-activated dissociation mass spectrometry (MAD-MS)", International Journal of Mass Spectrometry, 2015, pp. 178-186, vol. 390.
Yuji Shimabukuro et al., "Development of a Compact Atom Beam Source by Capacitively Coupled Plasma at 2.45GHz", Proc. of the 77th JSAP Academic Lecture, Sep. 2016, Japan Society of Applied Physics.
International Search Report of PCT/JP2020/000926 dated Mar. 3, 2020 [PCT/ISA/210].
Written Opinion of PCT/JP2020/000926 dated Mar. 3, 2020 [PCT/ISA/237].
Notice of Allowance dated Aug. 2, 2022 from the Japanese Patent Office in JP Application No. 2021-522619.

* cited by examiner

Fig. 8
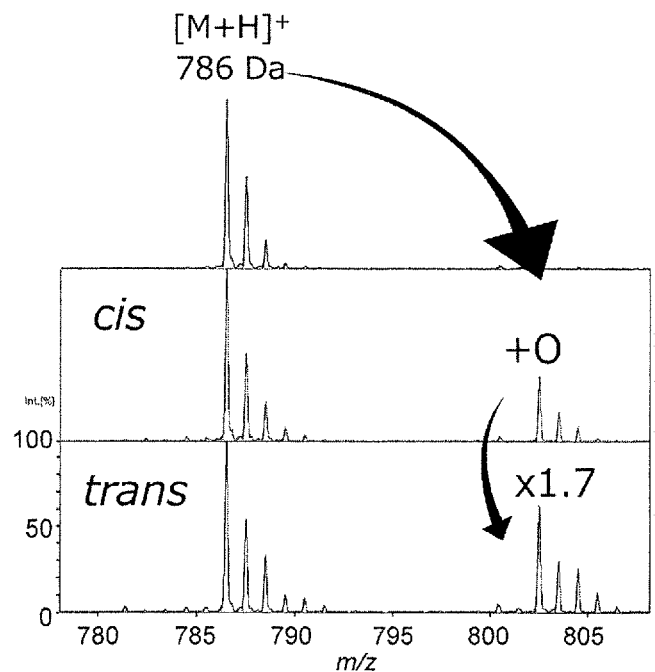
Fig. 9
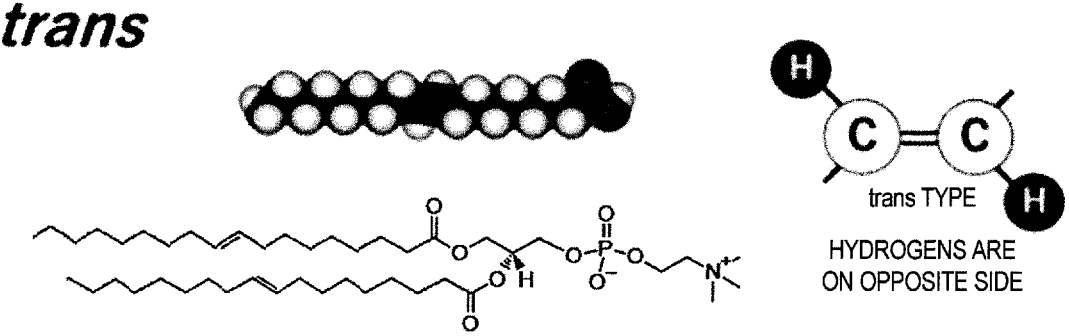
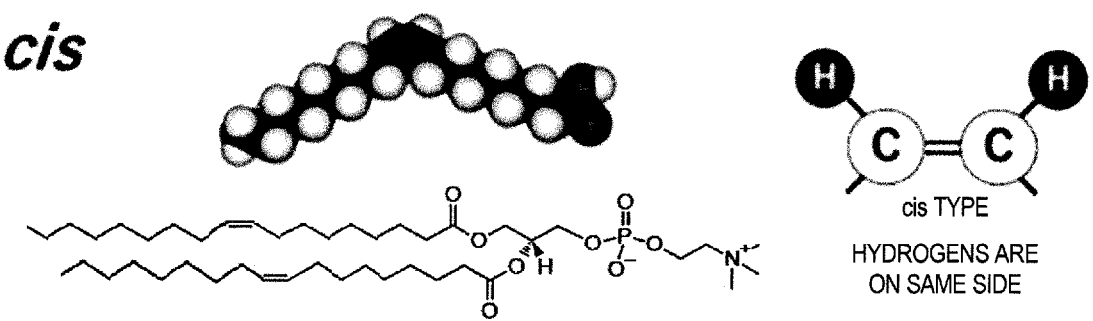

MASS SPECTROMETRY METHOD AND MASS SPECTROMETER

TECHNICAL FIELD

The present invention relates to a mass spectrometry method and a mass spectrometer.

BACKGROUND ART

A mass spectrometry method is widely used in order to identify a polymer compound and analyze its structure, in which an ion having a specific mass-to-charge ratio is selected as a precursor ion from ions derived from a sample component, and product ions are generated by dissociating the precursor ion one or more times, and the product ions are separated according to the mass-to-charge ratio, and detected. As a method for dissociating a precursor ion derived from a polymer compound, the LE-CID (Low-Energy Collision Induced Dissociation) method is most general in which the precursor ion is vibrated in the ion trap and caused to collide repeatedly with an inert gas such as argon so as to add a small amount of energy to the precursor ion repeatedly, whereby a dissociation is induced (for example, Non Patent Literature 1).

One of typical polymer compounds is fatty acid. Fatty acids are carboxylic acids having a hydrocarbon chain, and are roughly classified into saturated fatty acids and unsaturated fatty acids: saturated fatty acids have no unsaturated bond in the hydrocarbon chain, and unsaturated fatty acids have an unsaturated bond in the hydrocarbon chain. In unsaturated fatty acids, the biochemical activity changes depending on the position of an unsaturated bond contained in a hydrocarbon chain. Therefore, in analyzing fatty acids or substances containing fatty acids (for example, phospholipids formed by binding known structures called head groups to fatty acids), the analysis is conducted effectively by generating and detecting product ions that are useful for inferring the position of an unsaturated bond. However, in the energy storage type ion dissociation method such as the LE-CID method, since the energy imparted to the precursor ion is distributed throughout the molecule, the selectivity of the position at which the precursor ion dissociates is low, and it is difficult to generate product ions useful for inferring the position of an unsaturated bond.

Patent Literature 1 proposes another method for inferring the structure of the hydrocarbon chain of the unsaturated fatty acid. This method uses the fact that a precursor ion derived from unsaturated fatty acid selectively dissociates at an unsaturated bond position when ozone is introduced into the ion trap and reacted with the unsaturated fatty acid. The structure of the hydrocarbon chain is inferred from the mass of the product ion generated by dissociation of the precursor ion at the position of the unsaturated bond.

Patent Literature 2 and Non Patent Literature 2 disclose a method for inferring the position of an unsaturated bond using the following fact: if product ions are generated by irradiating a precursor ion derived from unsaturated fatty acid with a high-energy electron beam, or by using a high-energy collision induced dissociation (HE-CID) method in which the precursor ion is vibrated greater than the LE-CID method and collides with an inert gas, product ions that are generated from the precursor ion dissociating at the position of the unsaturated bond are less likely to be generated, and the detected intensity becomes smaller than that of product ions that are generated from the precursor ion dissociating at the position other than the unsaturated bond.

Non Patent Literature 3 discloses a method for inferring the position of an unsaturated bond using the following fact: if a precursor ion derived from unsaturated fatty acid trapped in the ion trap is first irradiated with He accelerated at a high speed, the precursor ion changes into a radical species. When collision-induced dissociation is performed to generate product ions after that, product ions that are generated from the precursor ion dissociating at the position of the unsaturated bond are less likely to be generated, and the detected intensity becomes smaller than that of the product ions generated from the precursor ion dissociating at the position other than the unsaturated bond.

CITATION LIST

Patent Literature

Patent Literature 1: AU 2007/211893
Patent Literature 2: CA 2951762

Non Patent Literature

Non Patent Literature 1: McLuckey, Scott A. "Principles of collisional activation in analytical mass spectrometry." Journal of the American Society for Mass Spectrometry 3.6 (1992): 599-614.
Non Patent Literature 2: Shimma, Shuichi, et al. "Detailed structural analysis of lipids directly on tissue specimens using a MALDI-SpiralTOF-Reflectron TOF mass spectrometer." PloS one 7.5 (2012): e37107.
Non Patent Literature 3: Deimler, Robert E., Madlen Sander, and Glen P. Jackson. "Radical-induced fragmentation of phospholipid cations using metastable atom-activated dissociation mass spectrometry (MAD-MS)." International journal of mass spectrometry 390 (2015): 178-186.
Non Patent Literature 4: Shimabukuro, Kasuya, Wada, "Development of a Compact Atom Beam Source by Capacitively Coupled Plasma at 2.45 GHz", Proc. of the 77th JSAP Academic Lecture, September 2016, Japan Society of Applied Physics

SUMMARY OF INVENTION

Technical Problem

The method described in Patent Literature 1 uses highly reactive ozone. This makes it necessary to introduce equipment such as an ozone filter for preventing ozone from being released into the atmosphere. If ozone enters the inside of the mass spectrometer, the electrodes and insulators of various parts may be oxidized and the performance of the mass spectrometer may deteriorate.

In the methods described in Patent Literature 2, Non Patent Literature 2, and Non Patent Literature 3, the position of the unsaturated bond is inferred using the fact that the detection intensity of product ions generated by dissociating precursor ions at the position of unsaturated bond is smaller than that of product ions generated by dissociating precursor ions at the position other than unsaturated bond. It should be noted that the intensity of the mass peaks of product ions dissociated at the position other than unsaturated bond may also be small depending on the type of unsaturated fatty acid and the measurement conditions. Thus, it is difficult with those methods to infer the position of the unsaturated bond with high accuracy.

An object of the invention is to provide a mass spectrometric technique capable of inferring the position of the unsaturated bond of a sample component having the hydrocarbon chain containing the unsaturated bond with simplicity and high accuracy.

Solution to Problem

The invention has been made to solve the above problems, and provides a mass spectrometry method for generating product ions from a precursor ion derived from a sample component having a hydrocarbon chain, and mass-analyzing the product ions, the mass spectrometry method including:
  irradiating the precursor ion with an oxygen radical or a hydroxy radical and a nitrogen oxide radical to generate product ions;
  separating the product ions according to mass-to-charge ratio, and detecting the product ions; and
  inferring a structure of the hydrocarbon chain based on mass-to-charge ratio of the detected product ions.

Another aspect of the present invention made to solve the above problems is a mass spectrometer for generating product ions from a precursor ion derived from a sample component having a hydrocarbon chain and mass-analyzing the product ions, the mass spectrometer including:
  a reaction chamber into which the precursor ion is introduced;
  a radical generation unit configured to generate an oxygen radical or a hydroxy radical and a nitrogen oxide radical;
  a radical irradiation unit configured to irradiate the precursor ion introduced into the reaction chamber with the oxygen radical or the hydroxy radical and the nitrogen oxide radical; and
  a separation detection unit configured to separate and detect the product ions generated from the precursor ion by a reaction with the oxygen radical or the hydroxy radical and a reaction with the nitrogen oxide radical according to mass-to-charge ratio.

Advantageous Effects of Invention

In the prior application (PCT/JP2018/043074), the present inventor has proposed that a precursor ion derived from a sample component having a hydrocarbon chain containing an unsaturated bond is irradiated with an oxygen radical or the like to generate and detect a product ion formed by adding oxygen atoms or the like to a fragment generated by dissociation of the precursor ion at the position of the unsaturated bond, and the position of the unsaturated bond is inferred from the mass of the product ion. In the prior application invention, in order to determine whether the detected product ion is a product ion formed by adding oxygen atoms or other ions, it is necessary to measure a precise mass of the product ion (a value after the decimal point of the mass-to-charge ratio). Therefore, it is assumed to use a time-of-flight mass spectrometer or the like having high mass resolution and mass accuracy.

The present invention is an improvement of the prior application invention. In the present invention, a precursor ion derived from a sample having a hydrocarbon chain containing an unsaturated bond is irradiated with a combination of two kinds of radicals: one is either oxygen radical or hydroxy radical, and the other is nitrogen oxide radical. This is based on the fact that the present inventor has found that when a precursor ion derived from a sample having a hydrocarbon chain containing an unsaturated bond is irradiated with a nitrogen oxide radical, a product ion formed by adding nitrogen dioxide ($NO_2$) to a fragment generated by dissociation of the precursor ion at the position of the unsaturated bond is generated. That is, when a precursor ion derived from a sample having a hydrocarbon chain containing an unsaturated bond is irradiated with an oxygen radical and a nitrogen oxide radical, both a product ion formed by adding an oxygen atom to a fragment generated by dissociation of the precursor ion at the position of the unsaturated bond and a product ion formed by adding nitrogen dioxide to the fragment are generated. When a precursor ion is irradiated with the hydroxy radical and the nitrogen oxide radical, both a product ion formed by adding a hydroxyl group to a fragment generated by dissociating the precursor ion at the position of an unsaturated bond and a product ion formed by adding nitrogen dioxide to the fragment are generated. Since a product ion formed by adding oxygen atoms or a hydroxyl group and a product ion formed by adding nitrogen dioxide have a specific mass difference (29 Da or 31 Da), product ions generated by dissociation at the position of an unsaturated bond are specified by extracting a pair of mass peaks satisfying the requirement, and the position of the unsaturated bond can be inferred from the mass simply and with high accuracy. In the present invention, since it is not necessary to measure the accurate mass, it is not necessary to use a mass spectrometer having high mass resolution and mass accuracy.

BRIEF DESCRIPTION OF DRAWINGS

FIG. 8 is a partially enlarged view of a product ion spectrum acquired by measuring product ions which are generated in the mass spectrometer of the modified embodiment by irradiating oxygen radicals, which are generated from oxygen gas by radio-frequency discharge under vacuum, to each of a precursor ion derived from a phospholipid having a cis unsaturated bond and a precursor ion derived from a phospholipid having a trans unsaturated bond.

FIG. 9 is a diagram illustrating molecular structures of a phospholipid in which the unsaturated bond is a trans type and a phospholipid in which the unsaturated bond is a cis type.

DESCRIPTION OF EMBODIMENTS

Hereinafter, an embodiment of a mass spectrometer and a mass spectrometry method according to the present invention will be described with reference to the drawings.

Figure 1:
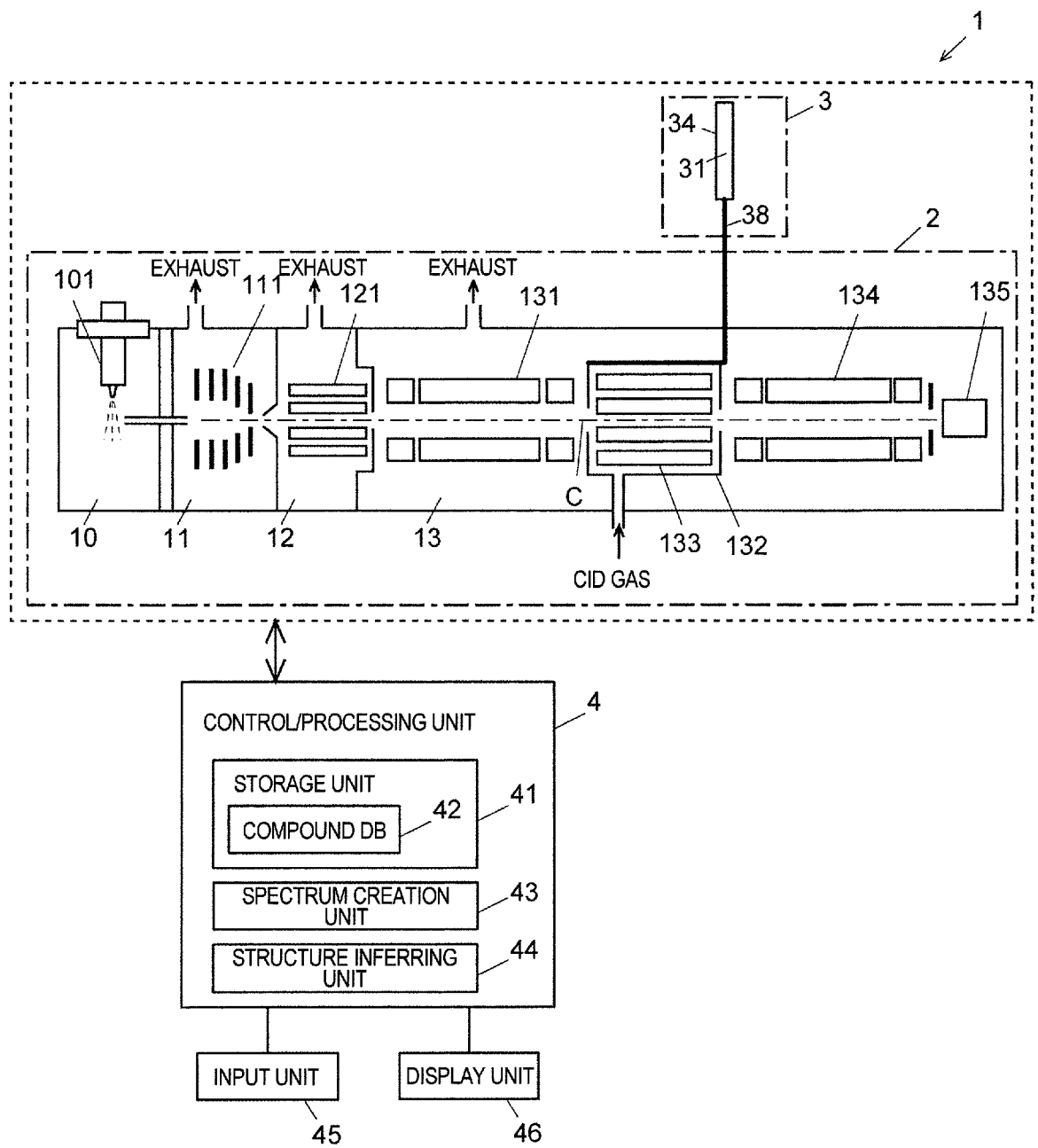
FIG. 1 is a configuration diagram of a main part of an embodiment of a mass spectrometer according to the present invention.

FIG. 1 is a schematic configuration diagram of a mass spectrometer 1 of the present embodiment. The mass spectrometer 1 roughly includes a mass spectrometer main body 2, a radical generation/irradiation unit 3, and a control/processing unit 4.

The mass spectrometer main body 2 of the present embodiment is a so-called triple quadrupole mass spectrometer. The mass spectrometer main body 2 has a configuration of a multi-stage differential exhaust system including a first intermediate vacuum chamber 11 and a second intermediate vacuum chamber 12 in which the degree of vacuum is increased stepwise between an ionization chamber 10 at substantially atmospheric pressure and a high-vacuum analysis chamber 13 evacuated by a vacuum pump (not illustrated). In the ionization chamber 10, for example, an ESI probe 101 is installed. In order to transport the ions to the subsequent stage while converging the ions, an ion lens 111 and an ion guide 121 are disposed in the first intermediate vacuum chamber 11 and the second intermediate vacuum chamber 12 respectively. In the analysis chamber 13, a front quadrupole mass filter 131, a collision cell 132 in which a multipole ion guide 133 is installed, a rear quadrupole mass filter 134, and an ion detector 135 are installed. Each of the front quadrupole mass filter 131 and the rear quadrupole mass filter 134 includes a main rod that performs mass separation of ions by applying an appropriate voltage, and a pre-rod and a post-rod for adjusting electric fields on a front stage side and a rear stage side of the main rod.

The radical generation/irradiation unit 3 generates a predetermined type of radical using radio-frequency plasma and irradiates the inside of the collision cell 132 of the mass spectrometer main body 2 with the radical. As a radical generation unit, for example, the configuration described in Non Patent Literature 4 can be used.

Figure 2:
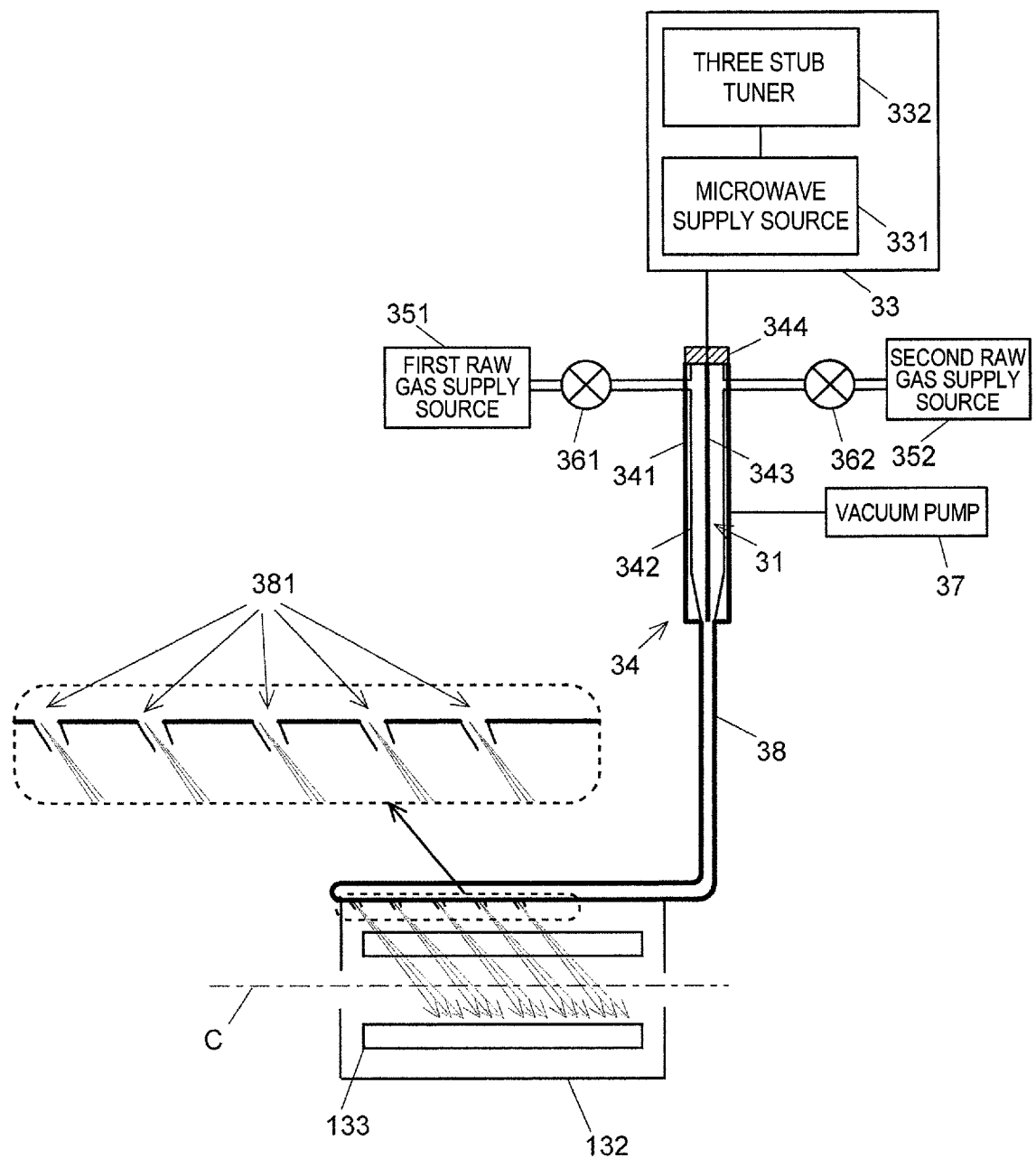
FIG. 2 is a schematic configuration diagram of a radical generation/irradiation unit of the mass spectrometer of the present embodiment.

FIG. 2 illustrates a schematic configuration of the radical generation/irradiation unit 3. The radical generation/irradiation unit 3 includes a nozzle 34 in which a radical generation chamber 31 is formed, a vacuum pump (vacuum exhaust unit) 37 that exhausts the radical generation chamber 31, and an inductively coupled radio-frequency plasma source 33 that supplies microwaves for generating vacuum discharge in the radical generation chamber 31.

The radio-frequency plasma source 33 includes a microwave supply source 331 and a three stub tuner 332. The nozzle 34 includes a ground electrode 341 constituting an outer peripheral portion and a torch 342 made of Pyrex (registered trademark) glass located inside the ground electrode, and the inside of the torch 342 serves as the radical generation chamber 31. Inside the radical generation chamber 31, a needle electrode 343 connected to the radio-frequency plasma source 33 via a connector 344 penetrates in the longitudinal direction of the radical generation chamber 31.

A transport pipe 38 for transporting radicals generated in the radical generation chamber 31 to the collision cell 132 is connected to an outlet end of the nozzle 34. The transport pipe 38 in the present embodiment is a pipe made of quartz (insulating pipe), and a plurality of types of quartz pipes (for example, four types of inner diameters: 5 mm, 1 mm, 500 μm, and 100 μm) having different inner diameters are prepared. These are appropriately used depending on the amount of radicals to be irradiated and the degree of vacuum of the collision cell 132. When the inner diameter is larger than 5 mm, the amount of gas flowing into the collision cell 132 through the transport pipe 38 increases, and the degree of vacuum in the collision cell 132 deteriorates. On the other hand, when the inner diameter is less than 100 μm, the amount of radicals irradiated to the precursor ions is insufficient.

In the transport pipe 38, a plurality of (five in the present embodiment) head parts 381 are provided in a portion disposed along the wall surface of the collision cell 132. Each head part 381 is provided with an inclined cone-shaped irradiation port, and is irradiated with radicals in a direction intersecting a central axis (ion optical axis C) of a flight direction of ions. This increases the chance of contact between ions flying along the ion optical axis C and radicals, and more radicals can be attached to the precursor ions. In this example, the irradiation port is provided so as to irradiate radicals in the same direction from each head part 381, but radicals may be irradiated in different directions from each head part 381, and the radicals may be evenly irradiated into the entire internal space of the collision cell 132. Alternatively, it is also possible to irradiate radicals with a simple configuration in which an opening is provided at the distal end of the transport pipe and the distal end is inserted into the collision cell 132.

The radical generation/irradiation unit 3 includes a first raw gas supply source 351 and a second raw gas supply source 352. The first raw gas supply source 351 supplies water vapor to the radical generation chamber 31, and the second raw gas supply source 352 supplies dry air to the radical generation chamber 31. The dry air is air containing no moisture, and is different from so-called atmosphere. Valves 361 and 362 for adjusting the flow rates of the respective gases are provided between the first raw gas supply source and the second raw gas supply source and the radical generation chamber.

The control/processing unit 4 has a function of controlling operations of the mass spectrometer main body 2 and the radical generation/irradiation unit 3 and storing and analyzing data obtained by the ion detector 135 of the mass spectrometer main body 2. The control/processing unit 4 is a general personal computer, and a storage unit 41 of the data processing unit contains a compound database 42. A spectrum creation unit 43 and a structure inferring unit 44 are provided as functional blocks. The spectrum creation unit 43 and the structure inferring unit 44 are embodied by executing a predetermined program installed in the personal computer in advance. The control/processing unit 4 is connected to an input unit 45 and a display unit 46.

For example, when the mass spectrometer of the present embodiment is used to analyze phospholipids, the compound database 42 is used which contains information on several tens of types of structures (characteristics of phospholipids) called head groups (information associated with names, structures, and masses of head groups), information on a ratio of the intensity of the precursor adduct ion (an ion in which oxygen atom is added to the precursor ion) to the intensity of the precursor ion generated from the phospholipid having a hydrocarbon chain including at least one unsaturated bond, and the like. The information contained in the compound database 42 may be based on the data acquired by actually measuring a standard sample or the like, or may be based on the data acquired from simulation by computational science.

Next, a flow of analysis using the mass spectrometer of the present embodiment will be described. Before starting the analysis of the sample component, the insides of the first intermediate vacuum chamber 11, the second intermediate vacuum chamber 12, the analysis chamber 13, and the radical generation chamber 31 of the mass spectrometer main body 2 are evacuated to a predetermined degree of vacuum by a vacuum pump. Subsequently, by opening the valves 361 and 362 to a predetermined opening degree, water vapor and air at a predetermined flow rate are supplied from the first raw gas supply source 351 and the second raw gas supply source 352 to the radical generation chamber 31. Thereafter, radio-frequency plasma is generated by supplying microwaves from the microwave supply source 331 to the needle electrode 343, and oxygen radicals and nitrogen oxide radicals are generated in the radical generation chamber 31. The oxygen radicals and the nitrogen oxide radicals generated in the radical generation chamber 31 are transported through the transport pipe 38 and irradiated from each head part 381 to the inside of the collision cell 132.

Next (or in parallel with the generation of radicals), a sample is introduced into the ESI probe 101 to generate ions. This may be performed by directly injecting a sample into the ESI probe 101, or may be performed by injecting a plurality of types of components contained in the sample into a liquid chromatograph and sending an eluate after the components are separated by a column to the ESI probe 101. Ions generated from the sample component in the ionization chamber 10 are drawn into the first intermediate vacuum chamber 11 by a pressure difference between the ionization chamber 10 and the first intermediate vacuum chamber 11, and are converged on the ion optical axis C by the ion lens 111. Subsequently, ions are drawn into the second intermediate vacuum chamber 12 by a pressure difference between the first intermediate vacuum chamber 11 and the second intermediate vacuum chamber 12, and are further converged by the ion guide 121. Thereafter, in the analysis chamber 13, ions having a predetermined mass-to-charge ratio are selected as precursor ions by the front quadrupole mass filter 131, and enter the collision cell 132.

In the collision cell 132, precursor ions derived from sample component are irradiated with oxygen radicals and nitrogen oxide radicals. At this time, the opening degrees of the valves 361 and 362 are appropriately adjusted so that the flow rate of radicals irradiated on the precursor ions becomes a predetermined flow rate. In order to generate both product ions formed by adding an oxygen atom or a hydroxyl group to a fragment dissociated at the position of an unsaturated bond and product ions formed by adding nitrogen dioxide to the fragment in a sufficiently detectable amount as described later, the ratio of water vapor in a mixed gas of water vapor and dry air is preferably 50 vol % or more, and more preferably 90 vol % or more.

The irradiation time of radicals to the precursor ions is also set appropriately. The opening degree of the valves 361 and 362 and the irradiation time of radicals can be determined in advance based on the results of preliminary experiments. When the precursor ions are irradiated with oxygen radicals and/or hydroxy radicals and nitrogen oxide radicals, unpaired electron-induced dissociation occurs in the precursor ions to generate product ions. As described later, product ions having different intensities depending on the type (cis/trans) of unsaturated bond included in the structure of the hydrocarbon chain are generated. The product ions generated from the precursor ions by the irradiation of radicals are emitted from the collision cell 132, subjected to mass separation by the rear quadrupole mass filter 134, and then incident on the ion detector 135 to be detected. Detection signals from the ion detector 135 are sequentially transmitted to the control/processing unit 4 and stored in the storage unit 41.

The spectrum creation unit 43 generates a product ion spectrum based on the detection signal and displays the spectrum on the display unit 46. The structure inferring unit 44 infers the structure of the sample component by performing predetermined data processing based on the information (mass information and intensity) obtained from this product ion spectrum. For example, when performing phospholipid analysis, the structure of the sample component is inferred based on the information of a difference between the mass of the product ion corresponding to a mass peak (the mass peak having an intensity that is significantly distinguishable from noises) appearing in the product ion spectrum created by the spectrum creation unit 43, and the mass of the head group contained in the compound database 42.

As described above, in the mass spectrometer 1 of the present embodiment, precursor ions derived from sample component are introduced into the collision cell 132, and oxygen radicals and/or hydroxy radicals and nitrogen oxide radicals are generated by radio-frequency discharge in the radical generation chamber 31, and the precursor ions passing through the collision cell 132 are irradiated with the oxygen radicals and/or hydroxy radicals and the nitrogen oxide radicals. As a result, the precursor ions react with the radicals to generate product ions.

Although specific measurement examples will be described later, according to the measurement performed by the present inventor, it has been found that when precursor ions derived from a sample component having a hydrocarbon chain containing an unsaturated bond are irradiated with oxygen radicals and/or hydroxy radicals and nitrogen oxide radicals, both product ions formed by adding an oxygen atom or a hydroxyl group to a fragment generated by dissociation of the precursor ions at the position of the unsaturated bond and product ions formed by adding nitrogen dioxide to the fragment are generated. It is known that in an ion in which an odd number of nitrogen atoms is added to the same fragment and an ion in which an even number (including zero) of nitrogen atoms is added, the integer part of one mass number is an odd number and the integer part of the other mass number is an even number. This is called a nitrogen rule. Specifically, these product ions have a specific mass difference (29 Da or 31 Da). Therefore, by extracting a pair of mass peaks satisfying the requirement from the product ion spectrum obtained by the above measurement, product ions generated by dissociation at the position of the unsaturated bond can be specified, and the position of the unsaturated bond can be inferred easily and with high accuracy from the mass.

Next, a mass spectrometer 100 of a modified embodiment having a configuration different from that of the mass spectrometer 1 of the above embodiment will be described. Note that components having the same functions as those of the mass spectrometer 1 of the above-described embodiment are denoted by the same reference numerals, and description thereof is omitted as appropriate.

Figure 3:
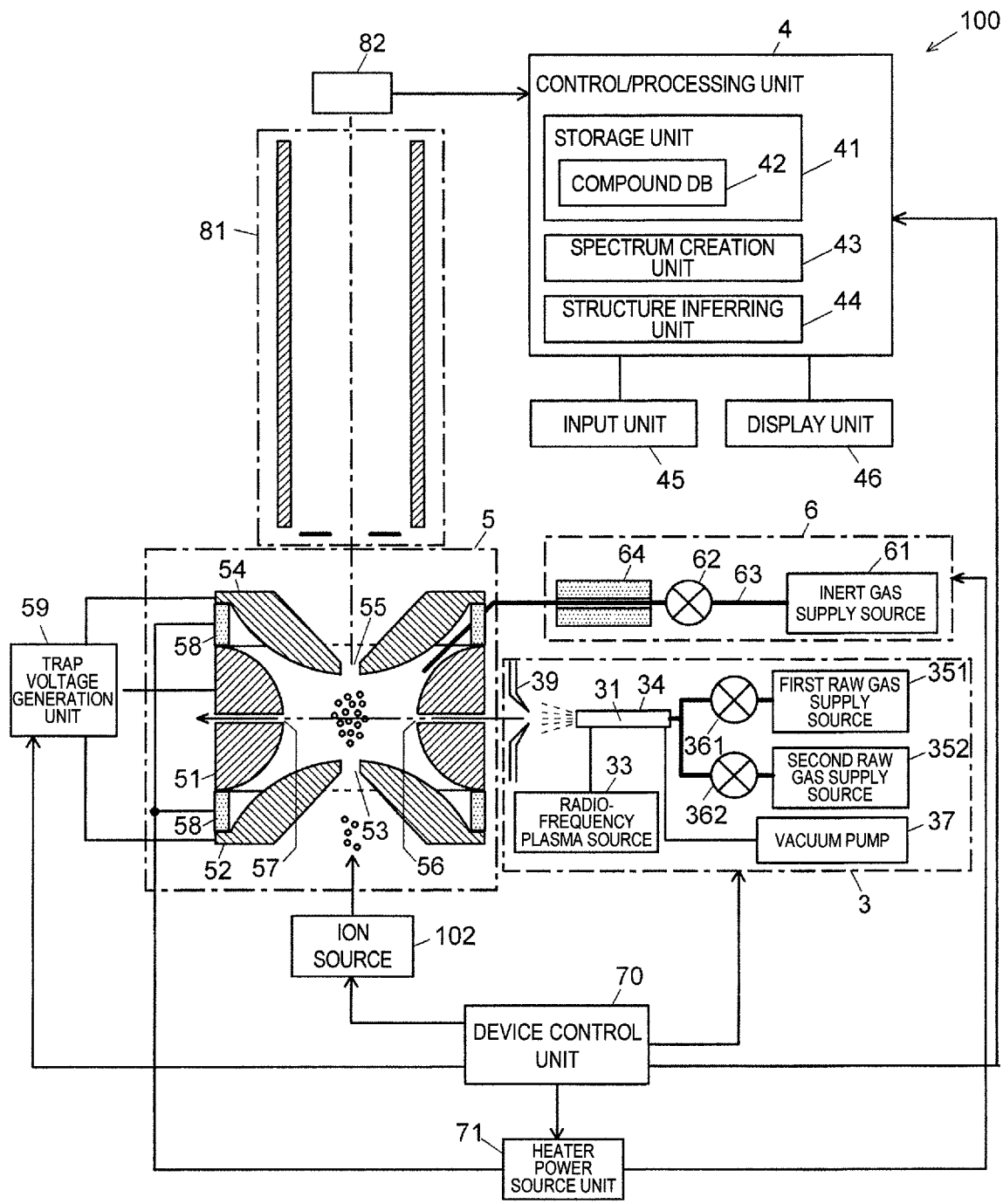
FIG. 3 is a schematic configuration diagram of a mass spectrometer according to a modified embodiment.

FIG. 3 illustrates a schematic configuration of the mass spectrometer 100 of the modified embodiment. The main body 2 of the mass spectrometer 100 is an ion trap-time-of-flight mass spectrometer. The mass spectrometer 100 of the modified embodiment, inside a vacuum chamber (not illustrated) maintained in vacuum, includes an ion source 102 for ionizing components in a sample, an ion trap 5 for trapping ions generated by the ion source 102 by the action of a radio-frequency electric field, a time-of-flight mass separation unit 81 for separating ions ejected from the ion trap 5 according to a mass-to-charge ratio, and an ion detector 82 for detecting the separated ions. The mass spectrometer 100 of the modified embodiment further includes a radical generation/irradiation unit 3 for irradiating the precursor ions trapped in the ion trap 5 with radicals in order to dissociate the ions trapped in the ion trap 5, an inert gas supply unit 6 for supplying a predetermined type of inert gas into the ion trap 5, a trap voltage generation unit 59, a heater power source unit 71, a device control unit (system controller) 70, and a control/processing unit 4.

The ion source 102 of the mass spectrometer of the present embodiment is a matrix assisted laser desorption/ionization (MALDI) ion source. In the MALDI ion source, a substance (matrix substance) that easily absorbs laser light and is easily ionized is applied to the surface of a sample, and sample molecules are incorporated into the matrix substance to be micro-crystallized, and the sample molecules are ionized by irradiating the matrix substance with laser light. Alternatively, a laser desorption/ionization (LDI) ion source may be used instead of the MALDI ion source. In the LDI ion source, the sample is directly irradiated with laser light to generate ions.

The ion trap 5 is a three-dimensional ion trap which includes an annular ring electrode 51, and a pair of end cap electrodes (an inlet-side end cap electrode 52 and an outlet-side end cap electrode 54) that are opposed to each other with the ring electrode 51 interposed therebetween. A radical introduction port 56 and a radical discharge port 57 are formed in the ring electrode 51. An ion introduction hole 53 is formed in the inlet-side end cap electrode 52. An ion ejection hole 55 is formed in the outlet-side end cap electrode 54. In response to an instruction from the control/processing unit 4 and the device control unit 70, the trap voltage generation unit 59 applies one of a radio-frequency voltage and a direct-current voltage or a combined voltage thereof to each of the electrodes 51, 52, and 54 at a predetermined timing.

A ceramic heater 58 is provided as an insulating member that maintains the relative positions of the electrodes 51, 52, and 54 and while securing electrical insulation between the ring electrode 51 and the end cap electrodes 52 and 54 of the ion trap 5. The ceramic heater 58 is connected to the heater power source unit 71, and when the heater power source unit 71 supplies electric power to the ceramic heater 58 under the control of the device control unit 70, the ceramic heater 58 generates heat. Then, the respective electrodes 51, 52, and 54 are also heated by heat conduction from the ceramic heater 58. A thermocouple (not illustrated) is embedded in the ceramic heater 58. The supplied power is adjusted based on the monitored temperature of the ceramic heater 58 by the thermocouple, and the amount of heat generated by the ceramic heater 58 is feedback-controlled. As a result, the ceramic heater 58 is accurately adjusted to a target temperature.

The radical generation/irradiation unit 3 has a configuration similar to that of the above embodiment, but includes, instead of the transport pipe 38, a skimmer 39 that has an opening on the central axis of the ejection flow from the nozzle 34 and separates diffusing raw material gas molecules and the like to extract a radical flow having a small diameter.

The inert gas supply unit 6 includes a gas supply source 61 which stores an inert gas such as helium or argon used as a buffer gas or a cooling gas, a valve 62 for adjusting the flow rate of the gas, and a gas introduction pipe 63.

While the electrodes 51, 52, and 54 of the ion trap 5 are being heated by the ceramic heater 58, a helium gas (or another inert gas) that is a buffer gas is intermittently introduced into the ion trap 5 from the inert gas supply unit 6 from the time when radicals are introduced into the ion trap 5 to the time when product ions are discharged from the ion trap 5. Then, the heat of the electrodes 51, 52, and 54 of the ion trap 5 propagates to the precursor ions via the buffer gas. The heat activates the ions, that is, the energy is applied by the heat, and the dissociation efficiency of the precursor ions is improved. A bond that is difficult to be broken (that is, a binding site having a high binding energy) in a state where heat is not applied is easily dissociated, so that more kinds of product ions are generated and the sequence coverage is improved.

A gas introduction pipe heater 64 is also provided around the gas introduction pipe 63 that supplies gas into the ion trap 5 from the gas supply source 61 of the inert gas supply unit 6. Electric power is supplied from the heater power source unit 71 to the gas introduction pipe heater 64 to preheat the gas introduction pipe 63, and a helium gas (or another inert gas) as a buffer gas is introduced into the ion trap 5 from the inert gas supply unit 6 at the same timing as the buffer gas is introduced into the ion trap 5. At this time, the helium gas is heated by the gas introduction pipe 63 near the heater 64 and is introduced into the ion trap 5 at a high temperature. When this high-temperature helium gas collides with the precursor ions, the heat of the helium gas is propagated to the ions and the dissociation of ions due to the irradiation of radicals is promoted. It is not always necessary to perform both heating of the electrodes 51, 52, and 54 by the ceramic heater 58 and heating of the buffer gas by the gas introduction pipe heater 64, and it is possible to configure so that only one is performed. Herein, the gas introduction pipe 63 is heated, but the same effect as above can be obtained by heating the inert gas supply source 61. Of course, both of them may be heated.

When radical adhesion and dissociation reactions occur sufficiently without heating the precursor ions, it is not necessary to energize the ceramic heater 58 and the introduction pipe heater 64. In this case, by introducing an inert gas into the ion trap 5, the precursor ions trapped in the ion trap 5 may be cooled and converged to the vicinity of the center of the ion trap 5.

Hereinafter, an actual measurement example using the mass spectrometer 1 of the present embodiment or the mass spectrometer 100 of the modified embodiment will be described.

1. Inferring Unsaturated Bond Position (1)

Figure 4:
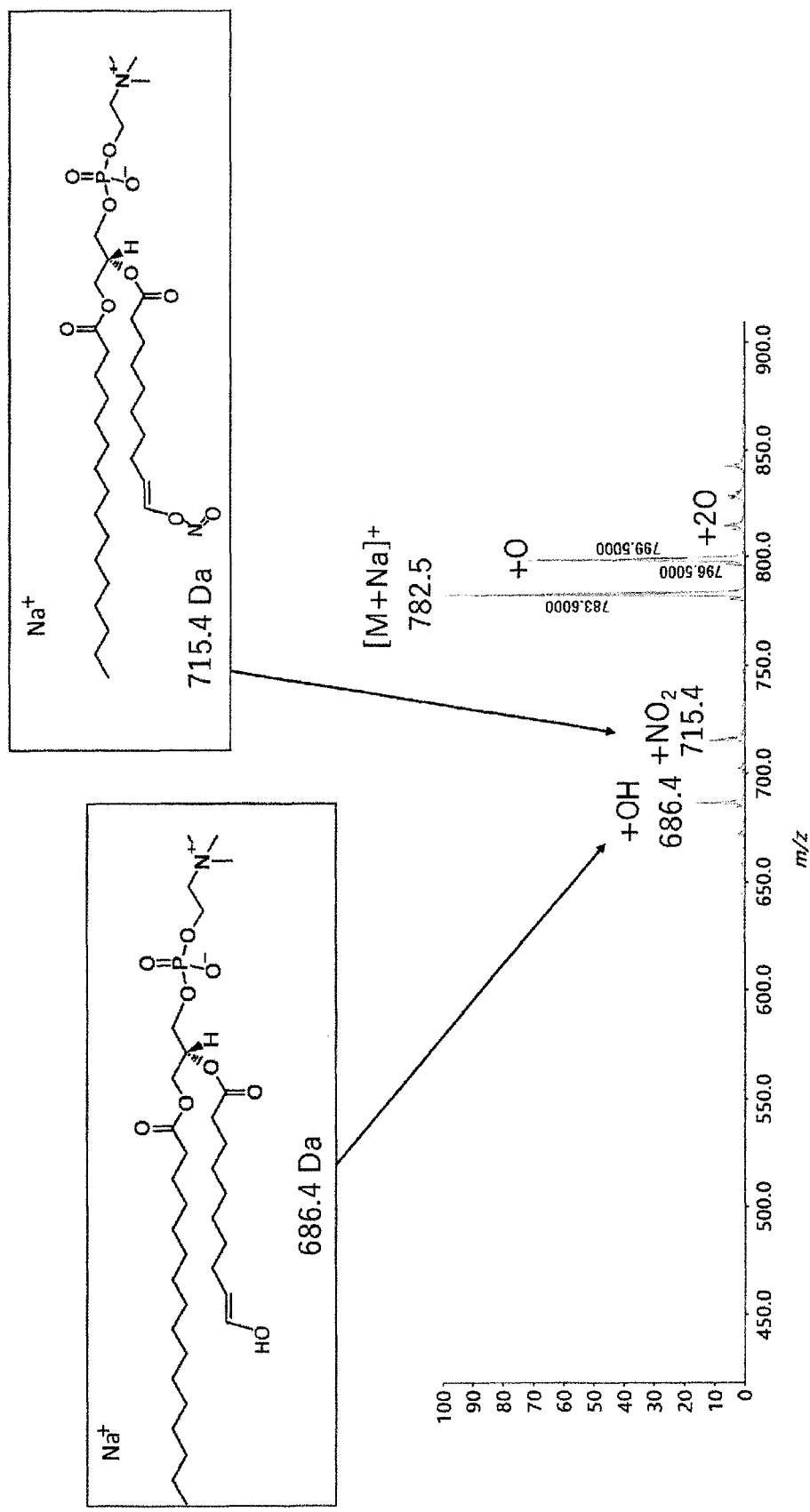
FIG. 4 is a product ion spectrum obtained by irradiating and measuring phospholipids with oxygen radicals and nitrogen oxide radicals generated from a mixed gas of water vapor and air by radio-frequency discharge under vacuum in the mass spectrometer of the present embodiment.

FIG. 4 is a product ion spectrum obtained by irradiating phosphotidylcholine PC (16:0/18:1), which is a kind of phospholipid, with radicals generated from a mixed gas of water vapor and dry air (ratio of water vapor in the mixed gas: 90 vol %) by microwave discharge using the mass spectrometer 1 of the above embodiment. As shown in the product ion spectrum of FIG. 4, a product ion (mass number 686.4) obtained by adding a hydroxyl group to a fragment dissociated at the position of an unsaturated bond and a product ion (mass number 715.4) obtained by adding nitrogen dioxide to a fragment dissociated at the position of an unsaturated bond are detected. As described above, by extracting a mass peak having a mass difference of 29 Da corresponding to a set of the product ion obtained by adding a hydroxyl group to a fragment dissociated at the position of an unsaturated bond and the product ion obtained by adding nitrogen dioxide to the same fragment, the position of the unsaturated bond can be specified using a so-called nitrogen rule, and the mass peak can be accurately assigned. Although the production amount is smaller than that of the product ions to which a hydroxyl group is added, a peak of the product ions to which an oxygen atom is added appears at a mass position smaller by 2 Da than that of the product ions. The mass difference between the product ions and the product ions obtained by adding nitrogen dioxide is 31 Da.

The product ion spectrum is acquired by irradiating the precursor ions derived from the sample component including the hydrocarbon chain having an unsaturated bond with the hydroxy radical or the oxygen radical, and the product ions derived from fragments dissociated at the position of the unsaturated bond is detected as described above, so that the structure such as the position of the unsaturated bond of the hydrocarbon chain and the length of the hydrocarbon chain included in the sample component can be inferred based on the mass corresponding to the position of the mass peak and the information contained in the compound database 42. The structure inferring unit 44 performs the above inferring and displays the result on the display unit 46.

2. Inferring Unsaturated Bond Position (2)

Figure 5:
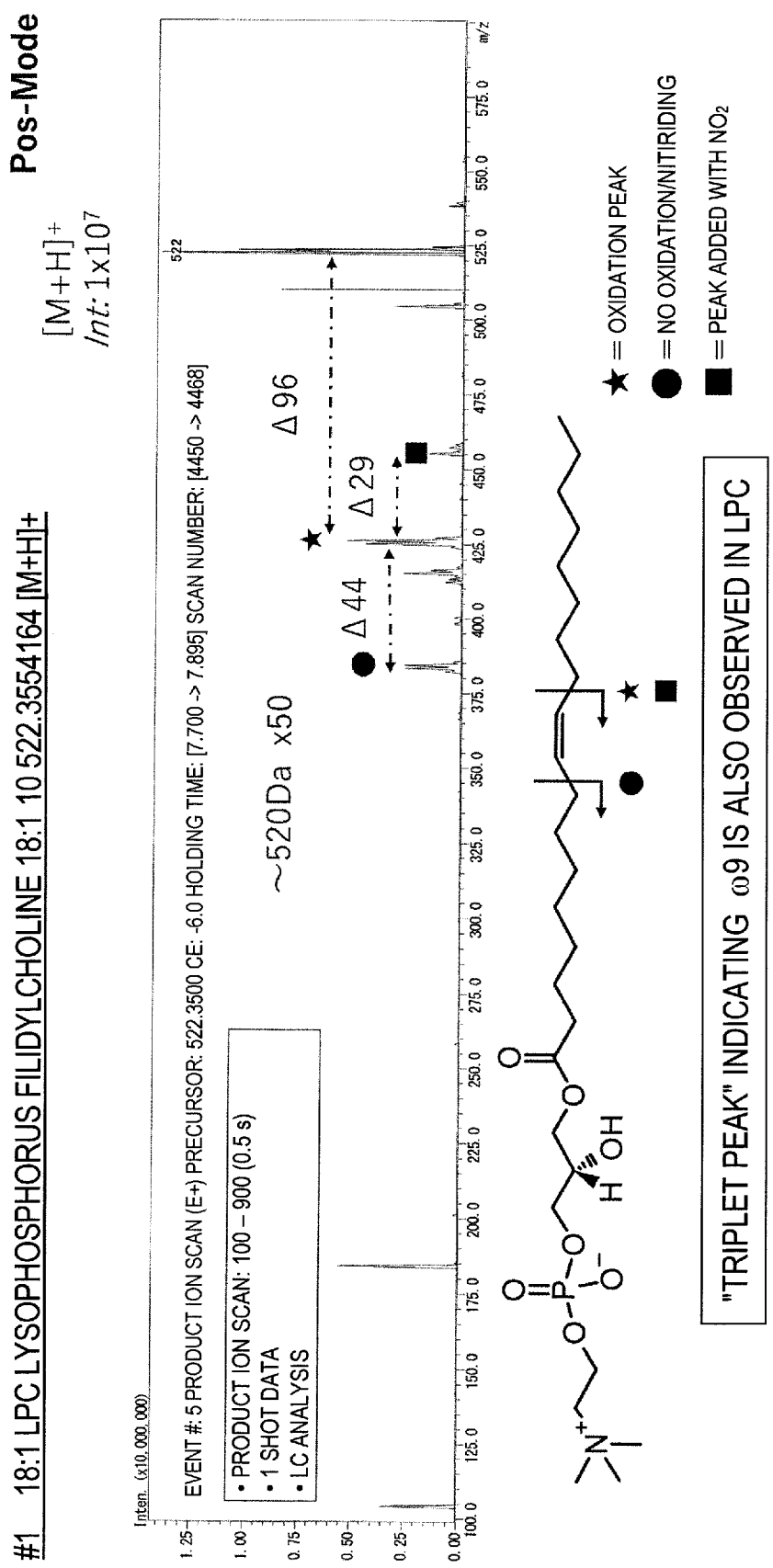
FIG. 5 is a product ion spectrum obtained by irradiating and measuring other phospholipids with oxygen radicals and nitrogen oxide radicals generated from a mixed gas of water vapor and air by radio-frequency discharge under vacuum in the mass spectrometer of the present embodiment.

FIG. 5 is a product ion spectrum obtained by irradiating lysophosphorus filidylcholine LysoPC (18:1 (9Z)), which is a kind of phospholipid, with radicals generated from a mixed gas of water vapor and dry air (ratio of water vapor in the mixed gas: 90 vol %) by microwave discharge using the mass spectrometer 1 of the above embodiment. In the product ion spectrum, a product ion (mass peak indicated by a star mark on the spectrum) obtained by adding a hydroxyl group to a fragment dissociated at the position of an unsaturated bond and a product ion (mass peak indicated by a square mark on the spectrum) obtained by adding nitrogen dioxide to a fragment dissociated at the position of an unsaturated bond are detected. Similarly to FIG. 4, a product ion obtained by adding an oxygen atom to a position having a mass smaller by 2 Da than that of a product ion obtained by adding a hydroxyl group is also detected. A mass peak of a fragment in which neither oxidation nor nitriding has occurred is also detected at a position indicated by a circle on the spectrum. Since the mass peak of this fragment appears at a position of a mass smaller by 44 Da than the mass peak of the product ion to which the hydroxyl group is added, the position of the unsaturated bond can be inferred based on a set including three mass peaks of (1) the product ion to which nitrogen dioxide is added, (2) the product ion to which the hydroxyl group or the oxygen atom is added, and (3) the fragment ion. Although the presence or absence and peak intensity of the mass peak of the fragment ion are different depending on the characteristics of the sample component, when the mass peak of the fragment ion is detected with the intensity as illustrated in FIG. 5, it is possible to more reliably infer the position of the unsaturated bond by extracting the set including three mass peaks.

In order to more reliably specify the mass peak of a product ion formed by adding a hydroxyl group or an oxygen atom or a product ion formed by adding nitrogen dioxide, it is effective to use water vapor of an isotope of oxygen ($^{18}O$). As a result, for product ions that are fragments with added oxygen atoms, two mass peaks appear which differ in mass by 2 Da, so it is possible to easily determine whether the detected product ions are fragments with added oxygen atoms.

Specifically, in the product ion spectrum of FIG. 5, the position of the mass peak of hydroxyl group, oxygen atom, or nitrogen dioxide shifts by +2 Da. In the measurement performed by the present inventor, a mass shift of +2 Da has been also confirmed for the product ions formed by adding nitrogen dioxide. It is considered that this is because nitrogen oxide radicals are generated from air (oxygen contained therein is $^{16}O$), and oxygen atoms ($^{18}O$) generated from water vapor are formed therein to constitute nitrogen dioxide. Therefore, when dry air containing $^{18}O$ is used, the mass peak of the product ion to which nitrogen dioxide is added is inferred to mass-shift by +4 Da.

In the product ion spectrum of FIG. 5, the fragment ions do not contain $^{18}O$ in the set of three mass peaks, so that the mass shift appears only in two mass peaks except for the mass peak of the fragment ion.

3. Confirmation of Radical Species

Figure 6:
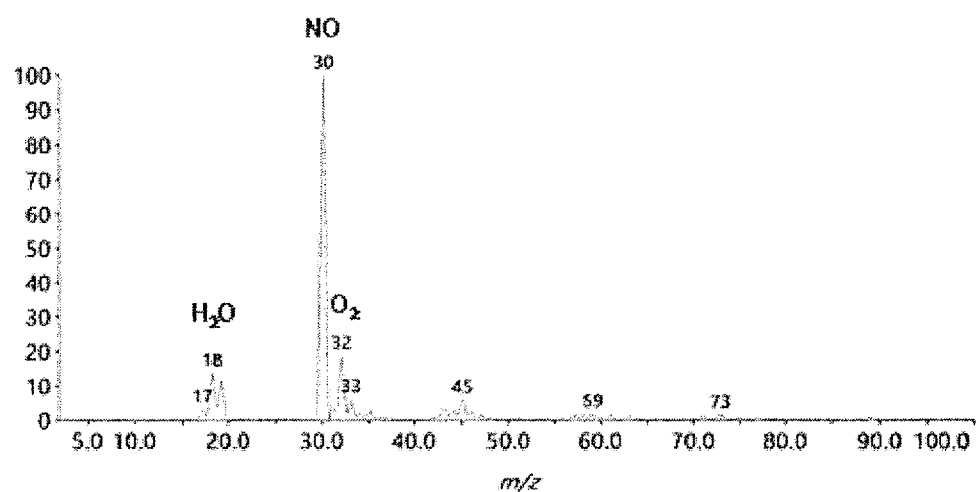
FIG. 6 is a mass spectrum acquired by measuring ions generated from a mixed gas of water vapor and air by radio-frequency discharge under vacuum in the mass spectrometer of the present embodiment.

FIG. 6 is a mass spectrum acquired by introducing radicals generated from a mixed gas of water vapor and air by microwave discharge into the collision cell 132 without introducing ions derived from a sample component, mass-separating ions corresponding to the radicals by the rear quadrupole mass filter 134, and detecting the ions by the ion detector 135 in the mass spectrometer 1 of the above embodiment. As illustrated in FIG. 6, mass peaks of NO (mass number 30) and 02 (mass number 32) appear in this mass spectrum. Although ions are directly detected by this measurement, it is considered that radicals having the same composition as the detected ions, that is, nitrogen oxide radicals and oxygen radicals are generated in the same manner. It is known that the NO (nitrogen monoxide) radical reacts immediately upon contact with oxygen to become $NO_2$ (nitrogen dioxide), and it is considered that the NO radical reacts with a product ion to which an oxygen atom is added to generate a radical to which nitrogen dioxide is added.

4. Inferring Unsaturated Bond Position (2)

Figure 7:
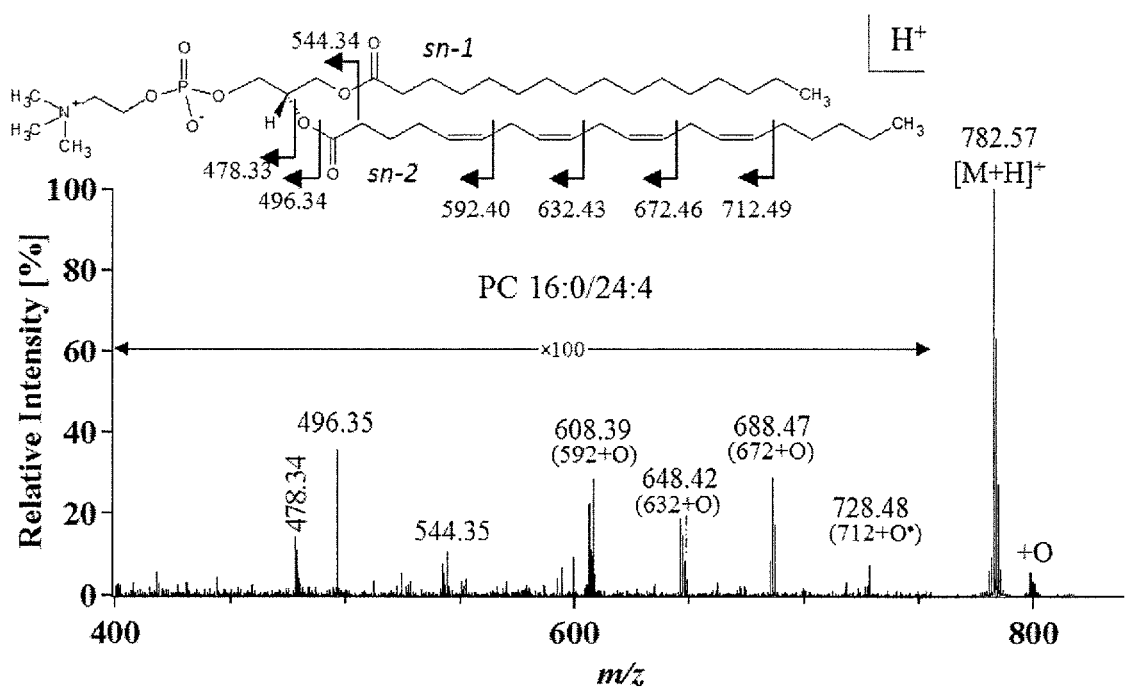
FIG. 7 is a product ion spectrum obtained by irradiating and measuring phospholipids with hydroxy radicals and oxygen radicals generated from water vapor by radio-frequency discharge under vacuum in the mass spectrometer of the modified embodiment.

FIG. 7 illustrates a product ion spectrum obtained by irradiating the precursor ions (phospholipid molecular ions) with radicals which are generated by trapping the phospholipid PC (16:0/20:4) having the structure (illustrated in the upper part of the drawing) in the ion trap 5 and discharging a radio-frequency discharge to water (water vapor) in vacuum, using the mass spectrometer 100 of the modified embodiment having an ion trap-time-of-flight type configuration. This measurement has been performed to confirm that selective dissociation occurs at the position of an unsaturated bond contained in a hydrocarbon chain due to a radical having oxidizing ability, and the nitrogen oxide radical has not been generated or irradiated.

In this product ion spectrum, the mass peak of the product ion appears in which an oxygen atom is added to a fragment generated by dissociating the precursor ion at the position of the unsaturated bond included in the hydrocarbon chain. Since the raw gas is water vapor and the mass peaks corresponding to the ions in which oxygen atoms are added to the precursor ions and fragments appear, it can be seen that the hydrocarbon chain is selectively dissociated at the position of the unsaturated bond by hydroxy radicals and oxygen radicals generated by the radio-frequency discharge of water vapor.

In this measurement example, the product ion to which an oxygen atom is added is generated, and it is considered that the unsaturated bond is selectively cleaved because the radical having an oxidizing ability is attached to the position of the unsaturated bond. Therefore, it is considered that the hydrocarbon chain can be selectively dissociated at the position of the unsaturated bond also by using a radical of a type other than these, which has the same oxidizing ability as the hydroxy radical and the oxygen radical.

Among the peaks of the product ion spectrum illustrated in FIG. 7, it can be seen that the intensity of the desorption peak of the carbon chain bonded to the sn-2 position (478 Da, 496 Da) is stronger than the strength of the desorption peak of the carbon chain bonded to the sn-1 position (544 Da). In particular, it can be seen that the desorption peak of the desorption peak at the sn-1 position (528 Da (=544 Da−16 Da)) corresponding to the desorption peak at the sn-2 position (478 Da) does not appear on the product ions. By using such characteristics, it is possible to infer at which position in a known structure (or structure candidate) such as a head group the hydrocarbon chain is bound in a phospholipid or the like. For example, by including in the compound database 42 information indicating the relationship between the bonding position of the hydrocarbon chain and the relative intensity of the mass peak appearing in the product ion spectrum, the structure inferring unit 44 can infer the structure of the hydrocarbon chain based on the product ion spectrum and also infer the overall structure of the sample component by specifying the bonding position of the hydrocarbon chain.

As described above, the selective cleavage at the position of the unsaturated bond is caused by the attachment of the radical having an oxidizing ability to one of the two carbons having the unsaturated bond. In many cases, as in the product ion spectrum illustrated in FIG. 7, many fragments to which oxygen atoms are added are detected as product ions after cleavage of the unsaturated bond. However, in many cases, many fragments to which oxygen atoms are not added are detected as product ions depending on the measurement conditions. When two types of product ions are detected by the dissociation of the same unsaturated bond, it becomes difficult to analyze the mass peak appearing in the product ion spectrum. In addition, depending on the structure of the hydrocarbon chain, the mass-to-charge ratio of the product ion, which is a fragment with added oxygen atoms, and the mass-to-charge ratio of the product ion, which is a fragment with another structure and without added oxygen atoms, may be almost the same. In a high-resolution mass spectrometer such as the time-of-flight mass separation unit of the present embodiment, the ions can be separated at the level of the mass-to-charge ratio below the decimal point, but they cannot be separated from each other by a general-purpose mass spectrometer in some cases.

When the measurement is performed using a general mass spectrometer, it is preferable to generate a hydroxy radical or an oxygen radical from the raw gas containing a stable isotope ($^{18}O$) of oxygen atom that is a mass number of 18 as described in measurement example 2. As a result, for product ions that are fragments with added oxygen atoms, two mass peaks appear which differ in mass by 2 Da, so it is possible to easily determine whether the detected product ions are fragments with added oxygen.

4. Inferring Unsaturated Bond Type

In the above example, the position of the unsaturated bond has been specified by focusing on the product ion generated by the cleavage of the unsaturated bond. However, not all unsaturated bonds of the precursor ion are cleaved. In some cases, even if radicals are attached at the position of the unsaturated bond, cleavage does not occur. In that case, an oxygen atom is bonded to both of the two carbon atoms having the unsaturated bond, and a product ion in which the bond between the two carbon atoms is changed to a saturated bond is generated. That is, an adduct ion in which oxygen atoms are added to the precursor ion (precursor adduct ion) is generated as a product ion.

FIG. 8 is an enlarged view of the vicinity of the mass-to-charge ratio of the precursor ion in the product ion spectrum obtained by irradiating two fatty acids, PC(18:1 trans) and PC(18:1 cis), with oxygen radicals for 1 second. The upper part of FIG. 9 illustrates the molecular structure of PC(18:1 trans), and the lower part of FIG. 9 illustrates the molecular structure of PC(18:1 cis). PC(18:1 trans) and PC(18:1 cis) differ only in whether the position of the unsaturated bond is a trans or cis type, and the other structures are the same.

From the results illustrated in FIG. 8, it can be seen that the strength of the precursor adduct ion generated from a fatty acid having a trans unsaturated bond is higher than the strength of a precursor adduct ion generated from a fatty acid having a cis unsaturated bond. For these, the ratio of the intensity of the precursor adduct ion to the intensity of the precursor ion has been determined, and the ratio of the former fatty acid is about 1.7 times the ratio of the latter fatty acid.

Figure 10:
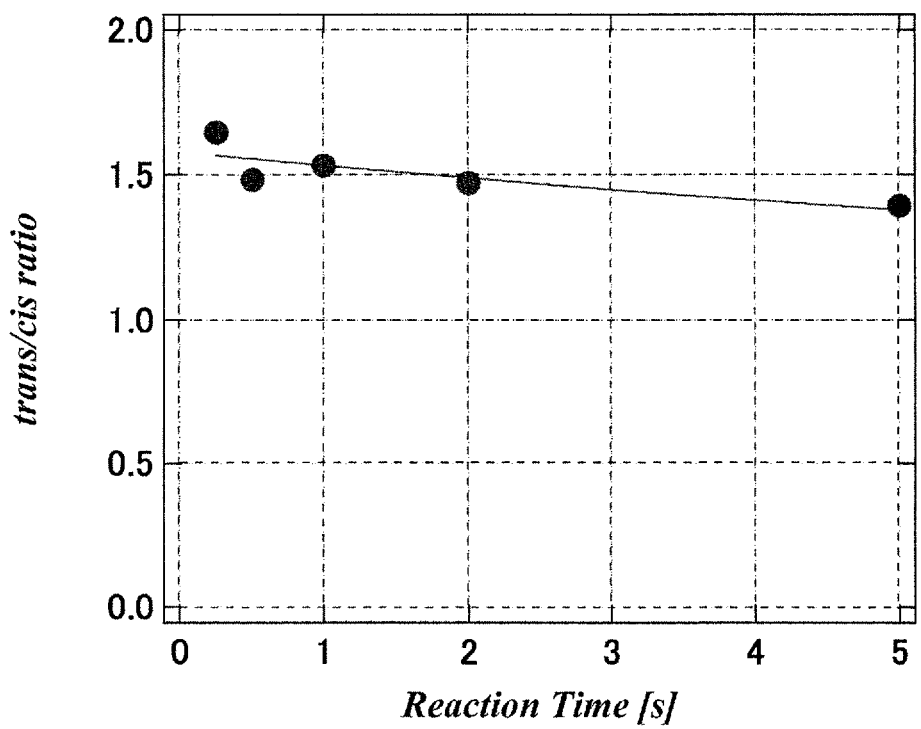
FIG. 10 is a graph illustrating a relationship between a reaction time and a ratio of a ratio of the detection intensity of precursor adduct ions generated from phospholipid having trans unsaturated bond to that of precursor ions and a ratio of the detection intensity of precursor adduct ions generated from phospholipid having cis unsaturated bond to that of precursor ions.

In a trans unsaturated bond, the hydrogen atoms bonded to two carbon atoms having the unsaturated bond are located on the opposite side of the unsaturated bond. That is, the oxygen radical can access the unsaturated bond from two directions in which the hydrogen atoms are located. On the other hand, in a cis unsaturated bond, the hydrogen atoms bonded to two carbon atoms having the unsaturated bond are located on the same side of the unsaturated bond. Therefore, the oxygen radical can access the unsaturated bond only from one direction. Therefore, it is considered that the reaction rate of the oxygen radical attached to the trans unsaturated bond is faster than the reaction rate of the oxygen radical attached to the cis unsaturated bond. The results illustrated in FIG. 8 are considered to reflect this difference in reaction rate. When the same measurement has been performed as illustrated in FIG. 10 while changing the reaction time with oxygen radicals, it has been confirmed that the ratio of the ratio (intensity ratio) of the detection intensity of precursor adduct ions generated from phospholipid having the trans unsaturated bond to the detection intensity of the precursor ions and the ratio (intensity ratio) of the detection intensity of the precursor adduct ions generated from phospholipid having the cis unsaturated bond to the detection intensity of the precursor ions becomes small as the reaction time became longer.

As described above, the trans unsaturated fatty acid and the cis unsaturated fatty acid can be distinguished from each other by utilizing the fact that the ratio of the intensity of the precursor adduct ion to the intensity of the precursor ion is different. For example, for the unsaturated fatty acids which is unclear in its type, a trans or cis type, the intensity ratio obtained by measurement using a standard sample is contained in a database in advance, and the ratio obtained from the measurement of the unsaturated fatty acid in which the type of unsaturated bond is unknown is compared to the ratio contained in the database, so that the type of the unsaturated bond can be inferred.

Figure 11:
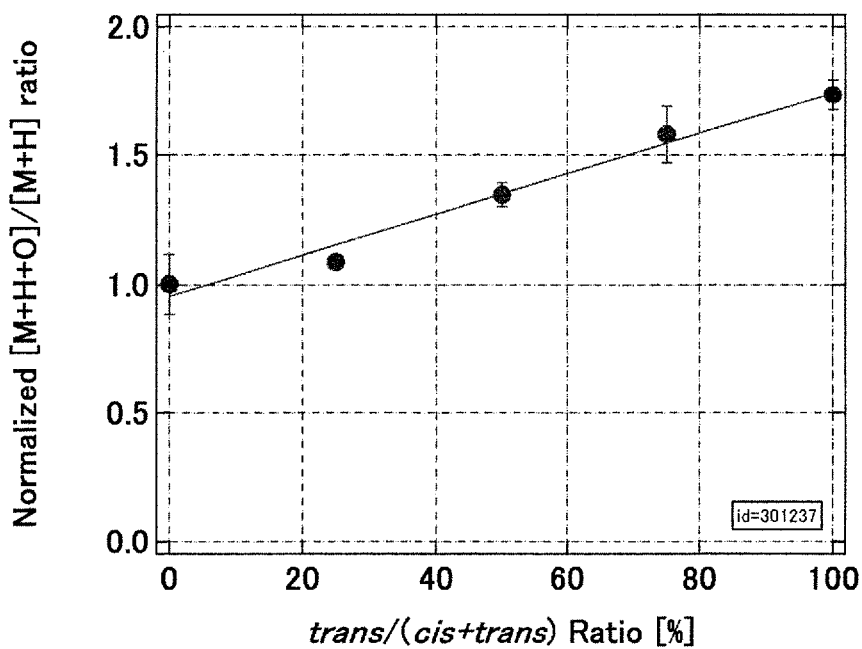
FIG. 11 is a graph illustrating a relationship between the ratio of the detection intensity of precursor adduct ions to that of precursor ions and a mixing ratio of trans unsaturated fatty acid and cis unsaturated fatty acid.

In FIG. 11, for a plurality of samples in which the cis unsaturated fatty acid is mixed with the trans unsaturated fatty acid in different ratios, in the same manner as above, the measurement of irradiating oxygen radicals for one second has been performed, and the result of having calculated the intensity ratio of the precursor adduct ions and the precursor ions is illustrated. From this result, it is confirmed that the intensity ratio increased linearly as the proportion of trans fatty acid increased. Therefore, by including information on the strength ratio of cis unsaturated fatty acids and the strength ratio of trans unsaturated fatty acids in the compound database 42, the ratio of the cis unsaturated fatty acid and the trans unsaturated fatty acid contained in the unknown sample can be inferred from the intensity ratio obtained from the measurement of the unknown sample where both the trans unsaturated fatty acids and cis unsaturated fatty acids may be contained. The information contained in the compound database 42 may be based on data obtained by measuring a standard sample or the like, or may be based on data obtained from computer simulation.

It is known that some trans unsaturated fatty acids adversely affect the human body, and it is important to identify whether a food sample contains trans unsaturated fatty acids. However, even if two types of components that have the same structure except that the types of unsaturated fatty acids are different are separated by a liquid chromatograph or gas chromatograph column, the elution times from both columns are very close (retention times are almost the same). Therefore, it is very difficult to separate the peak of trans unsaturated fatty acid and the peak of cis unsaturated fatty acid from the chromatogram obtained by chromatography. Utilizing the fact that the intensity ratio of the precursor adduct ions and the precursor ions is different between the cis unsaturated fatty acid and the trans unsaturated fatty acid as described above, it becomes possible to determine which of the cis unsaturated fatty acid and the trans unsaturated fatty acid is contained in an unknown sample or to determine a mixture of both acids.

Such a determination can be made more accurately by using a chromatograph mass spectrometric analysis which is a combination of a chromatograph and a mass spectrometer. As in the above embodiment, a chromatograph mass spectrometer having a configuration in which an electron ionization (EI) source, an electrospray ionization (ESI) source, or an atmospheric pressure chemical ionization (APCI) source is used as an ion source 101 and an eluate from a column of a gas chromatograph or a liquid chromatograph is ionized can be suitably used. Then, components of an unknown sample, in which it is unclear whether only one of the cis unsaturated fatty acid and the trans unsaturated fatty acid is contained, or whether both of them are contained, are separated by the chromatographic column and ionized to select the precursor ions, and irradiated with radicals having oxidizing ability. The product ions thus generated are mass-separated and detected. This series of measurements is repeated and executed during the time (retention time) during which unsaturated fatty acids of unknown cis type or trans type are being eluted from the chromatographic column. Three-dimensional data is obtained by plotting the intensity of the product ions in a graph with time (retention time) on one axis and mass-to-charge ratio on another axis.

From the three-dimensional data thus obtained, the intensity ratio of the precursor adduct ion and the precursor ion and its change with time are obtained. Although the retention times of the trans unsaturated fatty acids and the cis unsaturated fatty acids are very close, they are not exactly the same. If the unknown sample contains both the trans unsaturated fatty acids and the cis unsaturated fatty acids, for example, only the trans unsaturated fatty acids will elute during the first retention period, and gradually the cis unsaturated fatty acids also elutes at the same time. Finally, only the cis unsaturated fatty acids elute. Therefore, when the intensity ratio obtained from the above three-dimensional data gradually decreases with time, the eluate from the chromatographic column changes with time as described above. It is possible to infer that the unknown sample contains both the trans unsaturated fatty acids and the cis unsaturated fatty acids. When the intensity ratio of the precursor adduct ion and the precursor ion does not change with time, it can be determined that only one of the trans unsaturated fatty acid and the cis unsaturated fatty acid is contained. By comparing the intensity ratio with the intensity ratio contained in advance in the database, it can be inferred whether it is a trans unsaturated fatty acid or a cis unsaturated fatty acid.

As described above, the rate of reaction in which radicals are attached to unsaturated bonds depends on the temperature of radicals and the amount of radicals. Therefore, if the measurement conditions when determining the intensity ratio of precursor adduct ions and precursor ions of various components registered in the database and the conditions when measuring an unknown sample are different, the intensity ratio between the precursor adduct ions and the precursor ions may differ from the intensity ratio contained in the database even if the same components as those contained in the database are measured.

Therefore, it is preferable to perform the measurement using one or a plurality of standard samples before the measurement of the actual sample. When it is possible to use a standard sample containing the same components as those contained in the actual sample, it is preferable to compare the measurement result of the standard sample with the measurement result of the actual sample so as to infer whether the unsaturated fatty acid contained in the actual sample is a trans or cis type. If it is difficult to use a standard sample containing the same components as those contained in the actual sample, a standard sample containing any of the components contained in the database is used. Then, the intensity ratio obtained from the measurement of the standard sample is compared with the intensity ratio contained in the database, and the value of the intensity ratio contained in the database is corrected. This makes it possible to prevent the components contained in the actual sample from being erroneously inferred due to the difference in radical irradiation conditions. The standard sample may be measured by an external standard method, which is measured separately from the actual sample, or by an internal standard method, which is simultaneously measured with the actual sample. It should be noted that, when measuring by the internal standard method, it is necessary to use a standard sample that does not generate ions with the same mass-to-charge ratio as the ions that can be generated from the actual sample (at least the precursor ion and the precursor adduct ion).

The above method for inferring trans unsaturated fatty acid and cis unsaturated fatty acid using the intensity ratio of precursor adduct ion and precursor ion presupposes that a target intensity ratio to be compared with the intensity ratio obtained by measuring the actual sample, that is, the structure other than the type of the unsaturated bond is known in advance. The chemical formula of the hydrocarbon chain may be determined by measurement of irradiation with a radical having a reducing ability as described later, or may be determined by another method. The number and position of unsaturated bonds may be determined from the above measurement in which a radical having an oxidizing ability is irradiated, or may be determined by another method.

The above-described embodiment is merely examples, and can be appropriately modified in accordance with the spirit of the invention. In the above embodiment, the mass spectrometer 1 includes the mass spectrometer main body 2 having a triple quadrupole configuration or an ion trap-time-of-flight configuration, but a mass spectrometer having a configuration other than the triple quadrupole configuration or the ion trap-time-of-flight configuration can also be used. Although the radio-frequency plasma source is used in the above embodiment, radicals can also be generated using a hollow cathode plasma source or a magnetic field-confining plasma source. Alternatively, one that generates plasma by corona discharge or the like in an atmospheric pressure atmosphere may be used.

[Aspects]

It is understood by those skilled in the art that the plurality of exemplary embodiments described above are specific examples of the following aspects.

(First Aspect)

A first aspect of the present invention is a mass spectrometry method for generating product ions from a precursor ion derived from a sample component having a hydrocarbon chain and mass-analyzing the product ions, the mass spectrometry method including:
  irradiating the precursor ion with an oxygen radical or a hydroxy radical and a nitrogen oxide radical to generate a product ion;
  separating the product ions according to a mass-to-charge ratio and detecting the product ions; and
  inferring a structure of the hydrocarbon chain based on a mass-to-charge ratio of the detected product ions.

(Second Aspect)

A second aspect of the present invention is a mass spectrometer for generating product ions from a precursor ion derived from a sample component having a hydrocarbon chain and mass-analyzing the product ion, the mass spectrometer including:
  a reaction chamber into which the precursor ion is introduced;
  a radical generation unit configured to generate an oxygen radical or a hydroxy radical and a nitrogen oxide radical;
  a radical irradiation unit configured to irradiate the precursor ion introduced into the reaction chamber with the oxygen radical or the hydroxy radical and the nitrogen oxide radical; and
  a separation detection unit configured to separate and detect the product ions generated from the precursor ion by a reaction with the oxygen radical or the hydroxy radical and a reaction with the nitrogen oxide radical according to mass-to-charge ratio.

The mass spectrometry method of the first aspect and the mass spectrometer of the second aspect are improvement of the prior application invention. In these aspects, a precursor ion derived from a sample having a hydrocarbon chain containing an unsaturated bond is irradiated with a combination of two kinds of radicals: one is either oxygen radicals and nitrogen oxide radical This is based on the fact that the present inventor has found that when a precursor ion derived from a sample having a hydrocarbon chain containing an unsaturated bond is irradiated with a nitrogen oxide radical, a product ion formed by adding nitrogen dioxide ($NO_2$) to a fragment generated by dissociation of the precursor ion at the position of the unsaturated bond is generated. That is, when a precursor ion derived from a sample having a hydrocarbon chain containing an unsaturated bond is irradiated with an oxygen radical and a nitrogen oxide radical, both a product ion formed by adding an oxygen atom to a fragment generated by dissociation of the precursor ion at the position of the unsaturated bond and a product ion formed by adding nitrogen dioxide to the fragment are generated. Since these product ions have a specific mass difference (29 Da), product ions generated by dissociation at the position of an unsaturated bond are specified by extracting a pair of mass peaks satisfying the requirement, and the position of the unsaturated bond can be inferred from the mass simply and with high accuracy. In the mass spectrometry method of the first aspect and the mass spectrometer of the second aspect, since it is not necessary to confirm the accurate mass, it is not necessary to use a mass spectrometer having high mass resolution and mass accuracy.

(Third Aspect)

A mass spectrometer according to a third aspect of the present invention is the mass spectrometer of the second aspect, further including a structure inferring unit configured to extract a set of product ions having a mass difference of 29 Da or 31 Da among the detected product ions and infer a position of an unsaturated bond contained in the hydrocarbon chain.

In the mass spectrometer of the third aspect, the position of the unsaturated bond contained in the hydrocarbon chain can be inferred without bothering the user.

(Fourth Aspect)

The mass spectrometer according to a fourth aspect of the present invention is the mass spectrometer of the third aspect, where:
  the sample component is one in which a substance having a known structure or structure candidate is bound to a hydrocarbon chain;
  the mass spectrometer further includes a compound database in which information on the structure or structure candidate is contained; and
  the structure inferring unit is configured to infer a structure of the sample component based on a mass-to-charge ratio of the detected product ion and information on the structure or structure candidate contained in the compound database.

In the mass spectrometer of the fourth aspect, the structure of the sample component can be inferred without bothering the user.

(Fifth Aspect)

A mass spectrometer according to a fifth aspect of the present invention is the mass spectrometer of the third or fourth aspect, where the structure inferring unit is configured to infer a type of an unsaturated bond contained in a hydrocarbon chain of the sample component based on a ratio of an intensity of a product ion, which is an adduct ion in which oxygen atoms are added to the precursor ion, to an intensity of the precursor ion.

In the mass spectrometer of the fifth aspect, the type of the unsaturated bond contained in the hydrocarbon chain of the sample component can be inferred.

(Sixth Aspect)

A mass spectrometer according to a sixth aspect of the present invention is the mass spectrometer of the fifth aspect, where:
  the mass spectrometer further includes a compound database that contains information on the ratios of a plurality of components that are candidates for the hydrocarbon chain contained in the sample component; and the structure inferring unit is configured to infer a type of an unsaturated bond contained in the hydrocarbon chain of the sample component by comparing the ratio obtained by the measurement of the sample component with a ratio contained in the compound database.

In the mass spectrometer of the sixth aspect, the type of the unsaturated bond contained in the hydrocarbon chain of the sample component can be inferred without bothering the user.

(Seventh Aspect)

A mass spectrometer according to a seventh aspect of the present invention is the mass spectrometer of the sixth aspect, where:

the compound database contains information on the ratios for both cis and trans components that are common except for the type of unsaturated bond; and the structure inferring unit is configured to compare the ratio obtained by the measurement of the sample component with the ratio contained in the database to infer a proportion of a component having a cis unsaturated bond and a component having a trans unsaturated bond which are contained in the sample component.

In the mass spectrometer of the seventh aspect, it is possible to infer the ratio of the component having a cis type unsaturated bond and the component having a trans type unsaturated bond contained in the sample component without bothering the user.

(Eighth Aspect)

A mass spectrometer according to an eighth aspect of the present invention is the mass spectrometer of any one of the second to seventh aspects, where the radical generation unit is configured to generate the oxygen radical and the nitrogen oxide radical from a raw gas containing at least one of water vapor, nitrogen gas, and air.

Any gas used in the mass spectrometer of the eighth aspect is easy to handle, and measurement can be performed safely and inexpensively.

(Ninth Aspect)

A mass spectrometer according to a ninth aspect of the present invention is the mass spectrometer of any one of the second to eighth aspects, where the radical generation unit includes:

a radical generation chamber;

a vacuum exhaust unit for exhausting the radical generation chamber;

a raw gas supply source for introducing a raw gas into the radical generation chamber; and a vacuum discharge unit for generating vacuum discharge in the radical generation chamber.

(Tenth Aspect)

A mass spectrometer according to a tenth aspect of the present invention is the mass spectrometer of the ninth aspect, where the vacuum discharge unit is a radio-frequency plasma source, a hollow cathode plasma source, or a magnetic field-confining plasma source.

A mass separation unit for separating precursor ions by a mass spectrometer and a mass separation unit for separating fragment ions generated by dissociation of precursor ions by mass are disposed in a high vacuum space. Therefore, when an atmospheric pressure space is disposed between the mass separation units, it is necessary to dispose a large vacuum pump before and after the atmospheric pressure space, and the device becomes large and expensive. There is also a problem that the radicals generated under the atmospheric pressure are likely to collide with the surrounding gas and radicals and to be lost by recombination, and the utilization efficiency of radicals is poor. In the mass spectrometer of the ninth aspect or the tenth aspect, since a vacuum discharge unit such as a radio-frequency plasma source or a hollow cathode plasma source is used, it is not necessary to provide an atmospheric pressure space in the ion analyzer, and these problems do not occur.

(Eleventh Aspect)

A mass spectrometer according to an eleventh aspect of the present invention is the mass spectrometer of any one of the second to tenth aspects, where the mass spectrometer includes a front quadrupole mass filter and a rear quadrupole mass filter, and the reaction chamber is a collision cell provided between the front quadrupole mass filter and the rear quadrupole mass filter.

The configuration of the mass spectrometer of the eleventh aspect is a so-called triple quadrupole mass spectrometer, and by using the triple quadrupole mass spectrometer, measurement can be performed at a lower cost than that of an ion trap-time-of-flight mass spectrometer.

REFERENCE SIGNS LIST 1, 100 . . . Mass Spectrometer
2 . . . Mass Spectrometer Main Body
10 . . . Ionization Chamber
101, 102 . . . Ion Source
11 . . . First Intermediate Vacuum Chamber
111 . . . Ion Lens
12 . . . Second Intermediate Vacuum Chamber
121 . . . Ion Guide
13 . . . Analysis Chamber
131 . . . Front Quadrupole Mass Filter
132 . . . Collision Cell
133 . . . Multipole Ion Guide
134 . . . Rear Quadrupole Mass Filter
135 . . . Ion Detector
3 . . . Radical Generation/Irradiation Unit
31 . . . Radical Generation Chamber
33 . . . Radio-Frequency Plasma Source
331 . . . Microwave Supply Source
332 . . . Three Stub Tuner
34 . . . Nozzle
341 . . . Ground Electrode
342 . . . Torch
343 . . . Needle Electrode
344 . . . Connector
351 . . . First Raw Gas Supply Source
352 . . . Second Raw Gas Supply Source
361, 362 . . . Valve
38 . . . Transport Pipe
381 . . . Head Part
39 . . . Skimmer
4 . . . Control/Processing Unit
41 . . . Storage Unit
42 . . . Compound Database
43 . . . Spectrum Creation Unit
44 . . . Structure Inferring Unit
45 . . . Input Unit
46 . . . Display Unit
5 . . . Ion Trap
51 . . . Ring Electrode
52 . . . Inlet-Side End Cap Electrode
53 . . . Ion Introduction Hole
54 . . . Nozzle
54 . . . Outlet-Side End Cap Electrode
55 . . . Ion Ejection Hole 56 . . . Radical Introduction Port
57 . . . Radical Discharge Port
58 . . . Ceramic Heater
59 . . . Trap Voltage Generation Unit
6 . . . Inert Gas Supply Unit
61 . . . Gas Supply Source
62 . . . Valve
63 . . . Gas Introduction Pipe
64 . . . Gas Introduction Pipe Heater
70 . . . Device Control Unit
71 . . . Heater Power Source Unit
81 . . . Time-Of-Flight Mass Separation Unit
82 . . . Ion Detector
C . . . Ion Optical Axis

The invention claimed is:

1. A mass spectrometry method for generating product ions from a precursor ion derived from a sample component having a hydrocarbon chain, and mass-analyzing the product ion, the mass spectrometry method comprising:
irradiating the precursor ion with an oxygen radical or a hydroxy radical and a nitrogen oxide radical to generate product ions;
separating the product ions according to mass-to-charge ratio, and detecting the product ions; and
inferring a structure of the hydrocarbon chain based on mass-to-charge ratio of the detected product ions.

2. A mass spectrometer for generating a product ion from precursor ions derived from a sample component having a hydrocarbon chain and mass-analyzing the product ion, the mass spectrometer comprising:
a reaction chamber into which the precursor ion is introduced;
a radical generation unit configured to generate an oxygen radical or a hydroxy radical and a nitrogen oxide radical;
a radical irradiation unit configured to irradiate the precursor ion introduced into the reaction chamber with the oxygen radical or the hydroxy radical and the nitrogen oxide radical; and
a separation detection unit configured to separate and detect the product ions generated from the precursor ion by a reaction with the oxygen radical or the hydroxy radical and a reaction with the nitrogen oxide radical according to mass-to-charge ratio.

3. The mass spectrometer according to claim 2, further comprising a structure inferring unit configured to extract a set of product ions having a mass difference of 29 Da or 31 Da among the detected product ions and infer a position of an unsaturated bond contained in the hydrocarbon chain.

4. The mass spectrometer according to claim 3, wherein:
the sample component is one in which a substance having a known structure or structure candidate is bound to a hydrocarbon chain,
the mass spectrometer further comprises a compound database in which information on the structure or structure candidate is contained, and
the structure inferring unit is configured to infer a structure of the sample component based on mass-to-charge ratio of the detected product ion and information on the structure or structure candidate contained in the compound database.

5. The mass spectrometer according to claim 3, wherein the structure inferring unit is configured to infer a type of an unsaturated bond contained in the hydrocarbon chain of the sample component based on a ratio of an intensity of a product ion, which is an adduct ion in which oxygen atoms are added to the precursor ion, to an intensity of the precursor ion.

6. The mass spectrometer according to claim 5, wherein:
the mass spectrometer further comprises a compound database that contains information on the ratios of a plurality of components that are candidates for the hydrocarbon chain contained in the sample component; and
the structure inferring unit is configured to infer a type of an unsaturated bond contained in the hydrocarbon chain of the sample component by comparing the ratio obtained by the measurement of the sample component with the ratio contained in the compound database.

7. The mass spectrometer according to claim 6, wherein:
the compound database contains information on the ratios for both cis and trans components that are common except for the type of unsaturated bond; and
the structure inferring unit is configured to compare the ratio obtained by the measurement of the sample component with the ratio contained in the database to infer a proportion of a component having a cis unsaturated bond and a component having a trans unsaturated bond which are contained in the sample component.

8. The mass spectrometer according to claim 2, wherein the radical generation unit is configured to generate the oxygen radical and the nitrogen oxide radical from a raw gas containing at least one kind of water vapor, nitrogen gas, and air.

9. The mass spectrometer according to claim 2, wherein the radical generation unit further includes:
a radical generation chamber;
a vacuum exhaust unit for exhausting the radical generation chamber;
a raw gas supply source for introducing a raw gas into the radical generation chamber; and
a vacuum discharge unit for generating a vacuum discharge in the radical generation chamber.

10. The mass spectrometer according to claim 9, wherein the vacuum discharge unit is a radio-frequency plasma source, a hollow cathode plasma source, or a magnetic field confinement type plasma source.

11. The mass spectrometer according to claim 2, wherein the mass spectrometer includes a front quadrupole mass filter and a rear quadrupole mass filter, and the reaction chamber is a collision cell provided between the front quadrupole mass filter and the rear quadrupole mass filter.

* * * * *